Aug. 21, 1956   C. T. RASMUSSEN ET AL   2,759,312
CONTROL MEANS FOR TRACTOR SUPPORTED OFFSET DISK HARROWS
Filed Aug. 13, 1954
3 Sheets-Sheet 1

INVENTORS.
CLARENCE T. RASMUSSEN
WILLIAM S. TSUCHIYA
BY
C. T. Parker & R. C. Johnson
ATTORNEYS

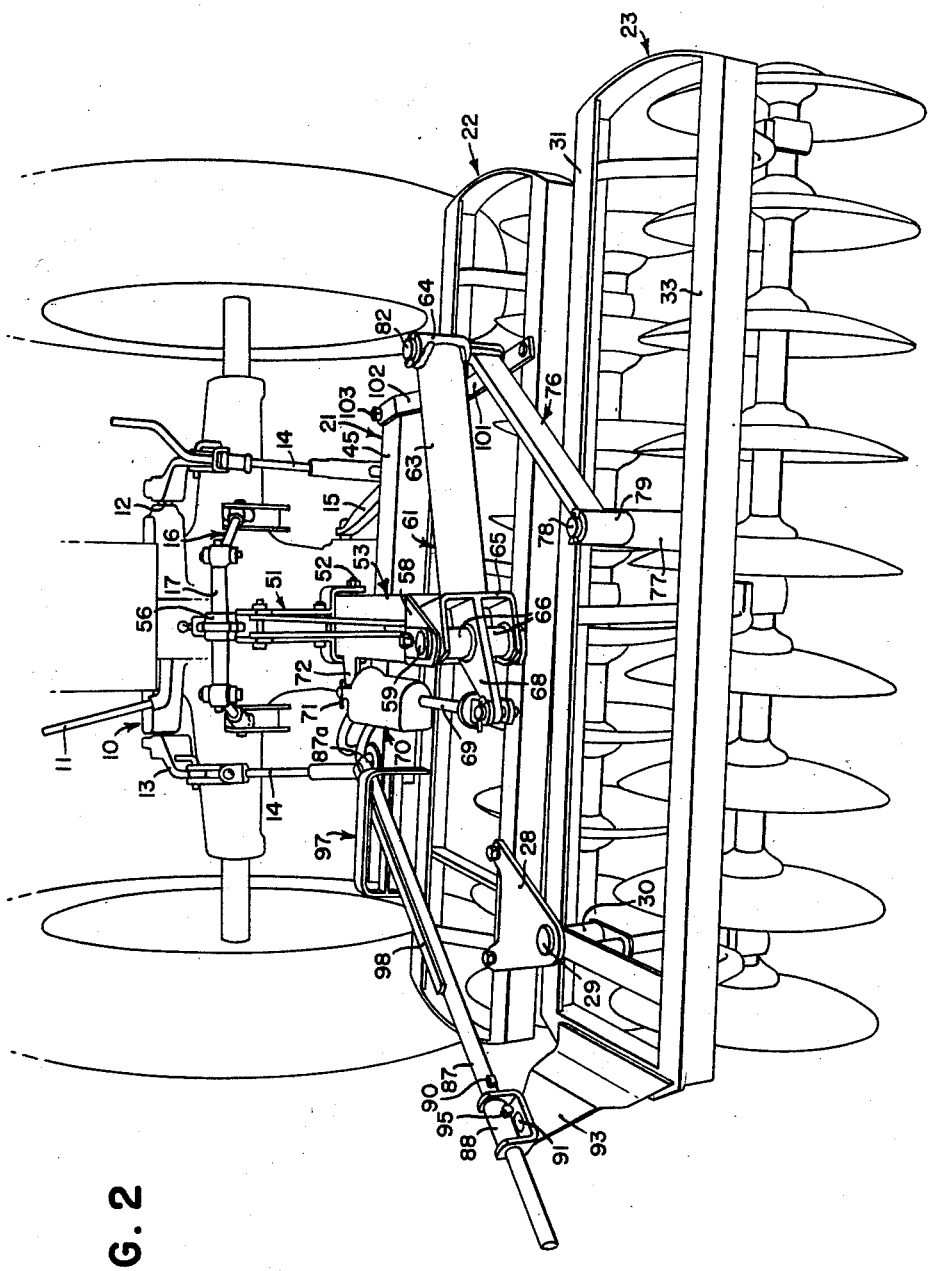

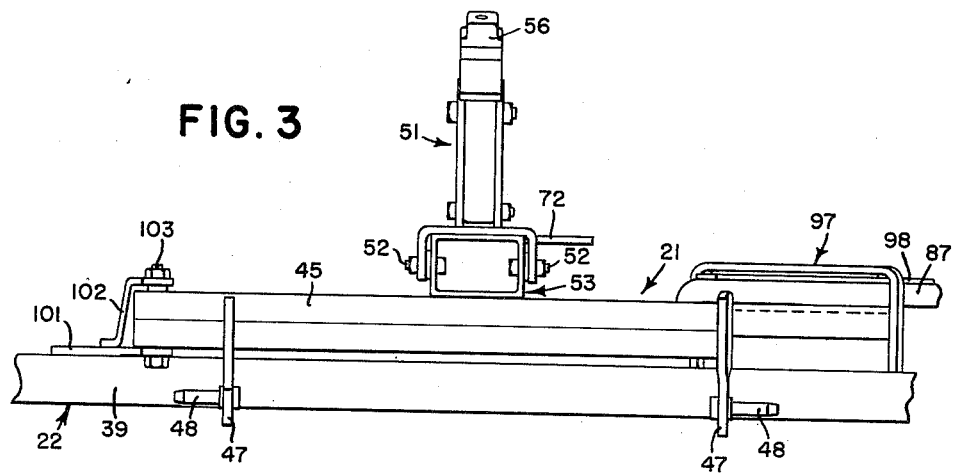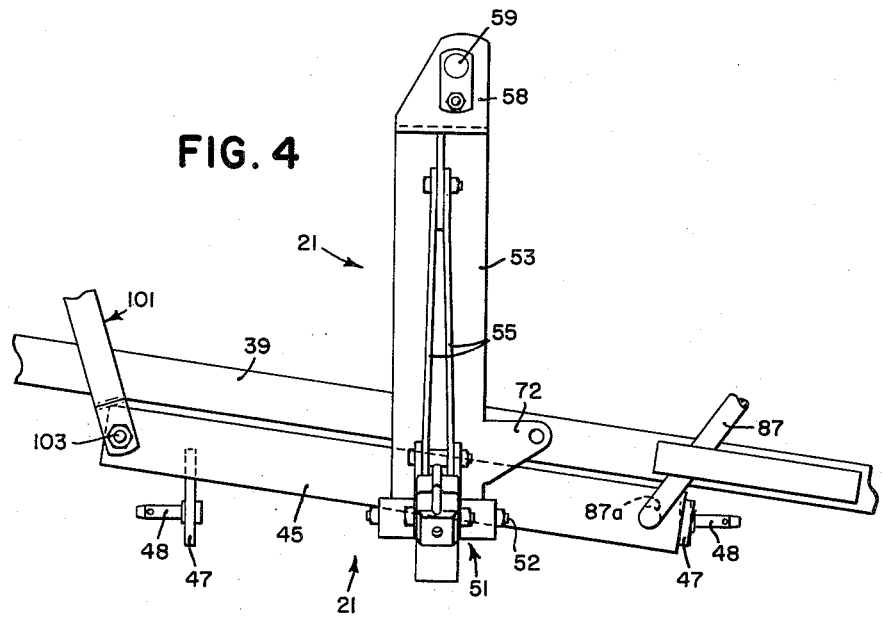

United States Patent Office 2,759,312
Patented Aug. 21, 1956

2,759,312

CONTROL MEANS FOR TRACTOR SUPPORTED OFFSET DISK HARROWS

Clarence T. Rasmussen, Alhambra, and William S. Tsuchiya, Los Angeles, Calif., assignors to John Deere Killefer Company, Los Angeles, Calif., a corporation of California Application August 13, 1954, Serial No. 449,539

5 Claims. (Cl. 55—83)

The present invention relates generally to agricultural implements and more particularly to implements of the type that is adapted to be connected with the power lift mechanism of a tractor so that the implement can be picked up bodily when it is desired to transport the implement from one place to another.

The object and general nature of the present invention is the provision of an implement, such as a disk harrow, having two units swingably interconnected and adapted to occupy positions behind the tractor when in operation, with hydraulic means operating in conjunction with the power lift system of the tractor so that when it is desired to transport the implement the operating units are both moved forwardly relative to the tractor before the units are raised off the ground. This reduces the overhanging weight of the implement in its transport position and thereby prevents overloading of the power lift mechanism of the tractor.

More specifically, it is a feature of this invention to provide a disk harrow of the tractor-mounted type wherein means is constructed and arranged to change the angular relationship of the front and rear gangs, respectively, through substantially equal increments; that is, when the rear gang is moved rearwardly through a given angle, the front gang is moved forwardly through the same angle. As a result of this construction, the harrow is not caused to shift toward either one side or the other when changing the working angle of the harrow. Particularly, it is a feature of this invention to provide a disk harrow wherein the latter includes a carrier, adapting the implement for attachment to three-point hitch devices and the like, with means carried by the hitch structure for angling the rear gang and additional means is provided, responsive to angular movement of the rear gang, for moving the front gang through substantially the same angle, but in the opposite direction, relative to the supporting draft structure.

These and other objects and advantages of the present invention will be apparent to those skilled in the art after a consideration of the following detailed description, taken in conjunction with the accompanying drawings, in which:

Fig. 2 is a similar perspective view showing the harrow in its closed and transport position.

Fig. 3 is a front view, looking rearwardly, of the hitch frame structure incorporated in the implement shown in Figs. 1 and 2, Fig. 3 being a view taken generally along the line 3—3 of Fig. 1 and looking rearwardly in the direction of the arrows.

Fig. 4 is a plan of the draft frame structure shown in Fig. 3.

Figure 1:
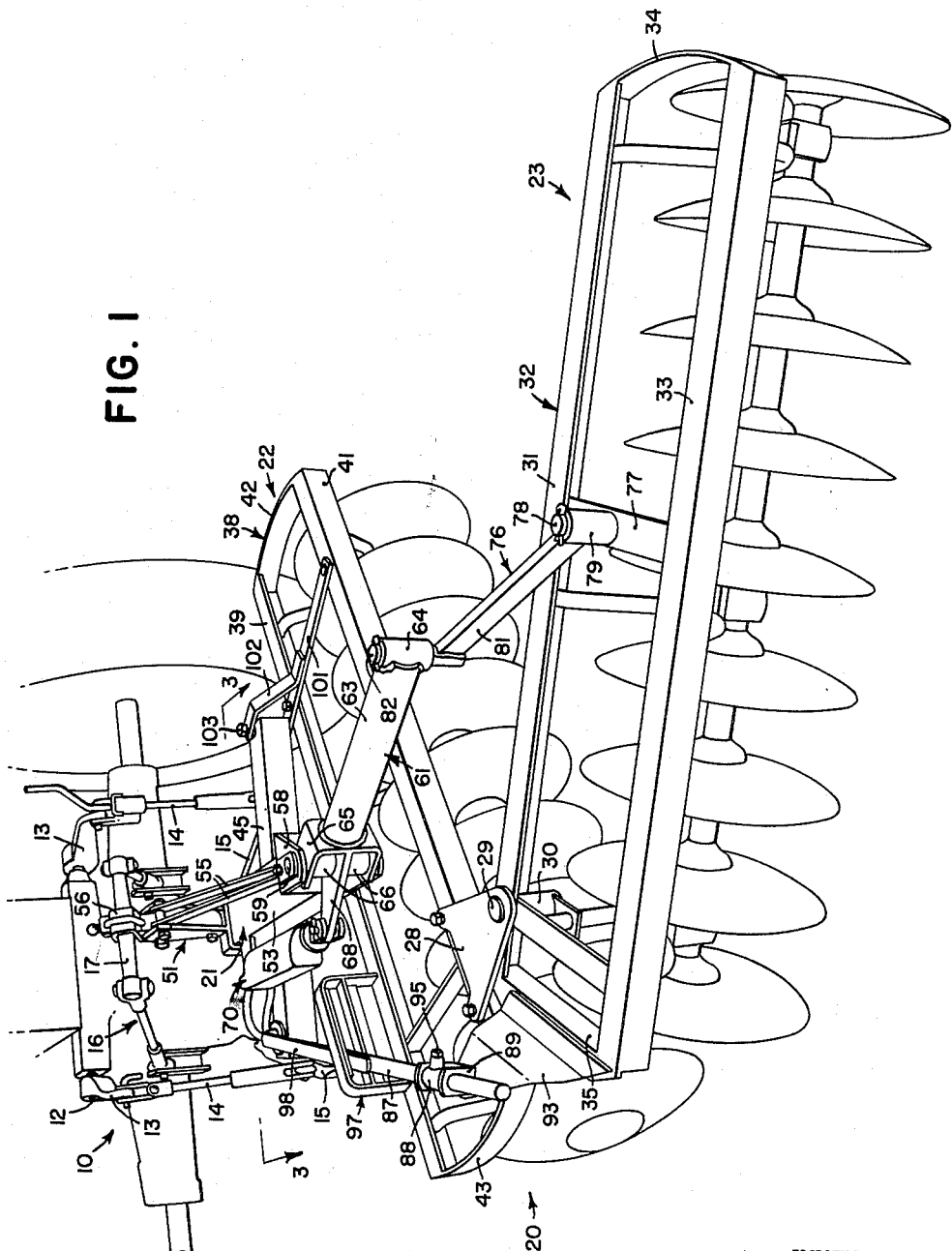
Fig. 1 is a perspective view showing a disk harrow in which the principles of the present invention have been incorporated, the harrow being shown in its operating position.

Referring first to Fig. 1, the disk harrow of the present invention is shown as connected with a farm tractor 10 which is of the type having a power lift system that includes an operating valve 11 controlling the hydraulic system of the tractor, the latter including a piston and cylinder unit connected to operate a rockshaft 12 to which a pair of lift arms 13 are connected. The arms 13 are, in turn, connected through lift links 14 with a pair of hitch or draft links 15 pivotally connected at their front ends with the tractor for universal movement and adapted to receive any one of a number of different implements at their rear ends. The hitch and power lift mechanism of the tractor also includes an upper generally vertically swingable hitch or draft link 16 which in the present instance is shown as a dual link arrangement having a transverse evener bar 17 and arranged to receive the upper portion of agricultural implements attached to the generally central portion of the evener bar 17.

The agricultural implement serving to illustrate the principles of the present invention is shown as a tractor-carried offset disk harrow 20 that includes a framework or hitch frame in the form of a front carrier frame structure 21, a front gang 22 and a rear gang 23. In the present instance, the left ends of the front and rear gangs are pivotally interconnected by means of a pivot bracket 28 carrying a pin 29 that is adapted to be pivotally received in a vertical bushing structure 30 carried on the left end of the forward frame bar 31. The frame of the rear gang 23 is indicated by the reference numeral 32 and includes, in addition to the front bar 31, a rear bar 33 and end bars 34 and 35. These members may be in the form of angles if desired. The gang frame of the front gang 22 is indicated by the reference numeral 38 and includes front and rear transverse bars 39 and 41 and end bars 42 and 43.

The carrier frame 21 includes a transversely arranged part 45, preferably made up of a pair of channels, and at each end of the member 45 there is a vertically disposed plate 47 to the lower end of which a link-receiving stud 48 is fixed. The carrier frame 21 also includes a vertically extending mast structure 51 that is connected at its lower end, as by transverse bolts 52, with the front end of a fore-and-aft extending part 53 of the carrier frame 21. As will be seen from Figs. 2 and 4, the part 53 extends generally rearwardly from the part 45. The mast section 51 is reenforced by downwardly and rearwardly extending brace bars 55. A connector 56 serves to connect the upper end of the mast section 51 with the central portion of the evener bar 17 of the upper link structure 16. The rearwardly extending part 53 of the carrier frame 21 is made up of a pair of channels, like the transverse part 45, and is connected to the latter in any suitable way, as by welding or the like. The rear ends of the rearwardly extending part 53 are provided with a yoke section 58 the upper and lower portions of which are apertured to receive a pivot 59 by which a gang-angling lever 61 is swingably connected with the carrier frame for movement relative thereto in a generally horizontal plane.

The gang-angling lever 61 comprises a pipe member 63 to the outer end of which a vertical bushing section 64 is fixed, as by welding. At its laterally inner end, the member 61 is provided with a vertically disposed yoke portion 65 having an interconnecting sleeve or bushing 66 receiving the pivot 59. This forms a vertically rigid hinged connection between the part 53 and the lever 61. Also secured to the yoke 65 is a laterally extending cylinder-receiving arm 68 in which the piston rod 69 of a ram unit 70 may be releasably connected. The other end of the unit 70 is releasably connected, as at 71, to an apertured lug 72 extending laterally from the associated rearwardly extending carrier part 53.

The ram unit 70 preferably is connected in parallel relation into the hydraulic system of a tractor whereby when the valve 11 is moved into its raising position, fluid is directed to the rockshaft-lifting cylinder as well as to the ram unit 70 simultaneously. The ram unit 70 is subjected to the lighter load, and therefore the unit 70 is operated before the rockshaft 12. Where tractors are available with separately controlled remote cylinder units, the unit 70 may be such a remotely controlled unit, and in that case the harrow may be closed by the operator at any time desired by operating the remotely controlled cylinder valve, and then the harrow, after being closed, may be raised into transport position by operating the other valve of the tractor hydraulic system.

The outer end of the gang-angling lever 61 is connected through a link member 76 with the frame 32 of the rear gang, the frame 32 having a crossbar 77 to which a pivot stud 78 is rigidly connected, as by welding, and extends upwardly therefrom. The pivot stud 78 receives a sleeve 79 welded to the rear end of the bar 81 that forms a major portion of the link 76, and a vertically disposed pin 82 is rigidly secured to the front end of the bar 81, as by welding or the like. The pin 82 is pivotally received within the bushing or sleeve 64 at the outer end of the gang-angling lever 61. The stud 78 and associated parts, together with the pin 82 and associated parts, form vertically rigid means hingedly connecting the link member, which is also a vertically rigid part, with the vertically rigid lever 61 and the rear gang so that in the raised or transport position of the implement, the link 76 and angling lever 61 transmits the major portion of the weight of the rear gang to the front frame structure 21.

An angling bar 87 is formed at its front end with a downturned end portion 87a that seats in an opening formed in the left end of the carrier transverse member 45. The angling bar 87 extends generally rearwardly and laterally outwardly and at its rear end portion receives an adjustable bushing or sleeve 88 that is disposed between the two end portions of a yoke 89 pivoted, as at 91, to a bracket plate 93 that is fixed, as by welding or the like, to the left or inner end of the rear gang frame 32. The sleeve or bushing 88 carries a set screw 95 by which the position of the sleeve 88 may be varied, as desired, along the rod 87. The rod 87 carries a lug 90 that limits the amount of adjustment of the sleeve 88 in the forward direction. If it were possible to move the sleeve 88 to a position forward of the lug 90, the harrow gangs might be damaged by the rear gang colliding with the front gang when the hydraulic ram unit 70 is fully extended. The front portion of the rod 87 extends through an angling bar slide 97, which is in the nature of a guide, fixed to the front angle of the front gang frame. A wear strap 98 is fixed to the bar 87. The right end of the front gang frame carries a strap member 101, which includes a hammer strap 102, these portions being apertured to receive a pivot bolt 103 by which the front gang 22 is pivotally connected to the right end of the transverse carrier bar 45.

The operation of a disk harrow as described above will be readily understood from the above description. Briefly, the operating position of the various parts are as illustrated in Fig. 1, the front and rear gangs being in their angled position, the front gang making about the same angle relative to a line transverse to the direction of travel as that made by the rear gang. If it should be desired to raise the implement into a transport position, for example, so as to pass to another field, across a grassed waterway, or the like, the operator actuates the tractor valve lever 11 and, as mentioned above, the first effort of the hydraulic system of the tractor is directed into the cylinder or jackshaft unit 70. This swings the angling lever 61 in a generally counterclockwise direction, as viewed in Fig. 1, pulling up on the rear gang through the link member 76. This movement continues, since the force required is much less than that of lifting the entire implement, until the front and rear gangs reach their transport position, as viewed in Fig. 2. In the transport position, the gangs close somewhat beyond their parallel position and make a slight angle relative to the line of forward travel, in order to dispose the gangs as close as possible to the tractor to reduce the lifting loads when raising the implement for transport. The transport position of the gangs is determined by the movement of the ram unit 70 to its fully extended position.

As will best be seen from Fig. 1, when the gang-angling lever 61 is swung forwardly, swinging the rear gang in a generally forward direction, the rear gang reacts through the link 87 against the carrier frame member 45, this movement of the rear gang acting through the pivot 29 between the gangs to swing the front gang 22 forwardly to its left end, the front gang moving about the pivot 103 as a center. The parts are so constructed and arranged that the angular displacement of the rear gang is substantially the same in degree as the angular displacement of the front gang, and by the time the ram unit 70 is fully extended, the gangs are disposed close behind the tractor, as indicated in Fig. 2. Thus, the effort required to lift them is reduced to a minimum, as compared with harrows in which the front gang is not moved forwardly relative to the tractor when the rear gang is moved forwardly toward the front gang.

Another advantage of the present invention accruing by virtue of the linkage described above is that whenever the angle between the gangs 22 and 23 is changed, as by operation of the hydraulic ram 70, it provides an equal change in angle of each gang as the hydraulic unit 70 changes the total angle between the gangs. This has the advantage of preventing the harrow from shifting to a different position of offset with respect to the tractor when the angle between the front and rear gangs is changed, either by increasing the same or by decreasing the same.

It will also be noted that a further feature of this invention resides in the fact that the hydraulic system of the tractor is not called upon to both de-angle the gangs and, at the same time, raise the harrow. Instead, according to the present invention, the harrow gangs are completely de-angled and moved into their transport position, close behind the tractor, before the hydraulic system is called upon to raise the harrow off the ground and into a transport position.

When the implement is raised into a transport position, Fig. 2, it will be noted that the vertical rigidity provided by the gang-angling lever 61, and the associated link 76, sustains the majority of the weight of the front and rear gangs and associated parts so that, when the carrier frame 21 is raised, the harrow as a whole is lifted into its transport position. That is to say, the front gang 22 is supported on the right end of the frame structure 21 through the strap member 101 and on the left end of the frame structure through the angling bar slide 97. The rear gang is supported primarily by the vertically rigid hinge connection between the members 61 and 76 and the associated parts. The rearwardly extending part 53 of the carrier frame extends substantially to a point midway between the front and rear gangs when the latter are in their transport position.

While we have shown and described above the preferred structure in which the principles of the present invention have been incorporated, it is to be understood that our invention is not to be limited to the particular details, shown and described above, but that, in fact, widely different means may be employed in the practice of the broader aspects of our invention.

What we claim, therefore, and desire to secure by Letters Patent is:

1. An offset disk harrow comprising a forward framework, front and rear gangs, means pivotally connecting said gangs for movement one relative to the other about a generally vertical axis, one gang being disposed in front of the other gang, and said one gang being swingably connected adjacent the end thereof at one side of said vertical axis for pivotal movement in a generally horizontal plane relative to said framework, means supporting the front and rear gangs on said framework comprising vertical hinge means connecting the front gang with said framework for movement relative thereto in a generally horizontal plane, an angling lever, vertical hinge means mounting said angling lever on said framework and having an outer end swingable relative to said framework and movable generally in a fore-and-aft direction, and a link hingedly connected with the swingable end of said angling lever and with the rear gang for moving the latter about said vertical axis, said hingedly connected link and said hinge connecting means providing vertical rigidity whereby said rear gang is supported on said forward framework, and a link connected between said framework and said rear gang at the other side of said vertical axis, the points of connection of said link with said framework and rear gang being so located that a displacement of said rear gang relative to said framework through a given angle causes a displacement of the front gang relative to said framework through the same angle but in the opposite direction.

2. A disk harrow adapted to be connected to the rearwardly extending, power-operated hitch links of a tractor, said disk harrow comprising a carrier frame having means to receive said hitch links and to be raised by raising of said links, a front gang, means pivotally connecting one end portion of the front gang to the adjacent end of said carrier frame, a rear gang, means pivoting the other end of said front gang to the adjacent end of the rear gang, a power-operated lever swingably mounted on the carrier frame for movement about a generally vertical axis relative to said carrier frame, means pivotally connecting the outer end of said lever with the rear gang at one side of the pivotal connection of the latter with the front gang, whereby movement of said lever changes the angle of said rear gang relative to said front gang, the connection between said lever and said rear gang being vertically rigid whereby the rear gang may be supported on the carrier frame through said lever, and means connected between the rear gang and said draft frame for causing both front and rear gangs to move forwardly when the rear gang is swung toward the front gang by operation of said lever.

3. In a disk harrow of the type adapted to be connected to a tractor having power-operated draft linkage adapted to be raised and lowered to raise and lower the attached implement, a carrier frame having means to receive said draft linkage, said carrier frame including a generally transversely disposed part and a rearwardly extending part, a front gang pivotally connected at one end with the adjacent end of said transverse carrier part, a rear gang pivotally connected at one end to the other end of said front gang, a gang-angling member, hinge connecting means pivotally connecting said gang-angling member with the rear end of said rearwardly extending carrier part, link means, hinge connecting means connecting the end portions of said link means with the rear gang and the outer end of said gang-angling member, said hinge connecting means being vertically rigid so as to transmit the weight of the rear gang to said rearwardly extending carrier frame part, means acting against said carrier for swinging said gang-angling member to open and close the harrow, a link connected to the other end of said carrier transverse member, and means connecting the rear end of said last-mentioned link with the rear gang, whereby closing movement imparted to said rear gang by the movement of said gang-angling member also acts to swing said front gang forwardly relative to said carrier.

4. In a disk harrow of the type adapted to be connected to a tractor having power-operated draft linkage adapted to be raised and lowered to raise and lower the attached implement, a carrier frame structure including a transversely disposed part and a rearwardly extending part, a front gang pivotally connected adjacent one end to the adjacent end portion of said transversely disposed carrier part and disposed below said rearwardly extending part, a second gang disposed rearwardly of said front gang and pivotally connected adjacent one end with the other end portion of said front gang, rear gang shifting means comprising a hydraulic ram unit mounted on said carrier frame structure and a lever connected with the rear end of said rearwardly extending part, the rear end of the latter carrying a vertical yoke having upper and lower portions pivotally receiving upper and lower portions of said lever, whereby the latter is rigidly held against vertical displacement relative to said carrier frame structure, said lever being pivotally mounted on said carrier frame structure for movement relative thereto about a generally vertical axis adjacent the rear end of said rearwardly extending carrier part, a vertically rigid link hingedly connected at its forward end to the rear end of said lever for movement relative thereto about a vertical axis, and means hingedly connecting the rear end of said link to the generally central portion of said rear gang for movement relative thereto about a vertical axis, said lever and link acting to transmit at least the major portion of the weight of said rear gang to the rearwardly extending part of said carrier frame structure and said latter part extending to a point between said gangs when they are swung forwardly into a position adjacent the transversely disposed carrier part, and means operatively connecting said lever with said ram unit.

5. The invention defined in claim 4, further characterized by an angling link pivotally connected at its forward end to said carrier and at its rear end to said rear gang at the side of its pivotal connection with the front gang opposite the hinged connection of said rigid link with the rear gang, the points of connection of said angling link being located on said carrier and said rear gang so that when the rear gang is displaced through a given angle by operation of said ram unit the front gang is displaced relative to said carrier through the same angle but in the opposite direction.

References Cited in the file of this patent

UNITED STATES PATENTS

| | | |
|---|---|---|
| 1,893,641 | Boda | Jan. 10, 1933 |
| 2,341,139 | Dyrr | Feb. 8, 1944 |
| 2,575,622 | Fraga | Nov. 20, 1951 |
| 2,638,045 | Heitshu | May 12, 1953 |